United States Patent
Chou et al.

(10) Patent No.: US 8,411,550 B2
(45) Date of Patent: Apr. 2, 2013

(54) SEEK AND SCAN PROBE (SSP) CANTILEVER STOP STRUCTURES

(75) Inventors: Tsung-Kuan Allen Chou, San Jose, CA (US); David Harrar, II, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 723 days.

(21) Appl. No.: 12/258,878

(22) Filed: Oct. 27, 2008

(65) Prior Publication Data

US 2010/0103806 A1    Apr. 29, 2010

(51) Int. Cl.
*G11B 7/00*    (2006.01)

(52) U.S. Cl. .................................................. 369/126

(58) Field of Classification Search .................... None
See application file for complete search history.

(56) References Cited

U.S. PATENT DOCUMENTS

| 2006/0144143 A1* | 7/2006 | Gogoi et al. ............ 73/504.12 |
| 2006/0182004 A1* | 8/2006 | Maeda et al. ............ 369/126 |
| 2007/0121477 A1 | 5/2007 | Belov |
| 2007/0268808 A1 | 11/2007 | Culver |
| 2007/0291623 A1 | 12/2007 | Belov |
| 2008/0237755 A1 | 10/2008 | Chou |
| 2008/0239931 A1* | 10/2008 | Koga et al. ............ 369/126 |

OTHER PUBLICATIONS

Heck, John , "Forming a Cantilever Assembly for Vertical and Lateral Movement", U.S. Appl. No. 11/824,465, Filed: Jun. 29, 2007.
Adams, Donald E., et al., "Cantilever with membrane capacitor for PFM (piezoresponse force microscopy) sensing in SSP / Piezo-force magnitude by capacitance sensor detector methods", U.S. Appl. No. 12/030,101, Filed Feb. 12, 2008.

* cited by examiner

*Primary Examiner* — Joseph Haley
*Assistant Examiner* — Emily Frank
(74) *Attorney, Agent, or Firm* — Cool Patent, P.C.; Joseph P. Curtin

(57) ABSTRACT

MEMS storage devices and associated systems and structures are generally described. In one example, a micro-electro-mechanical (MEMS) storage device includes a substrate, a lateral actuation structure coupled with the substrate, a micro-electro-mechanical (MEMS) probe coupled with the lateral actuation structure, the MEMS probe having a first end, a second end having a probe tip, and a longitudinal axis extending between the first end and the second end, wherein the second end can be actuated in a direction substantially normal to a surface of the substrate, and one or more stop beam structures coupled with the lateral actuation structure to restrict motion of the MEMS probe in the direction substantially normal to the surface of the substrate.

19 Claims, 3 Drawing Sheets

SEEK AND SCAN PROBE (SSP) CANTILEVER STOP STRUCTURES

TECHNICAL FIELD

Embodiments disclosed herein are generally directed to the field of storage devices. More particularly, embodiments herein generally relate to seek and scan probe (SSP) cantilever-stop structures.

BACKGROUND

Generally, seek and scan probes (SSP) are emerging as storage devices for reading and/or writing data. Due to process and environmental variations, a gap between a probe tip and a storage medium or media may be non-uniform. Solutions to mitigate challenges associated with such non-uniformity are desirable.

BRIEF DESCRIPTION OF THE DRAWINGS

Embodiments disclosed herein are illustrated by way of example, and not by way of limitation, in the figures of the accompanying drawings in which like reference numerals refer to similar elements and in which.

Figure 1:
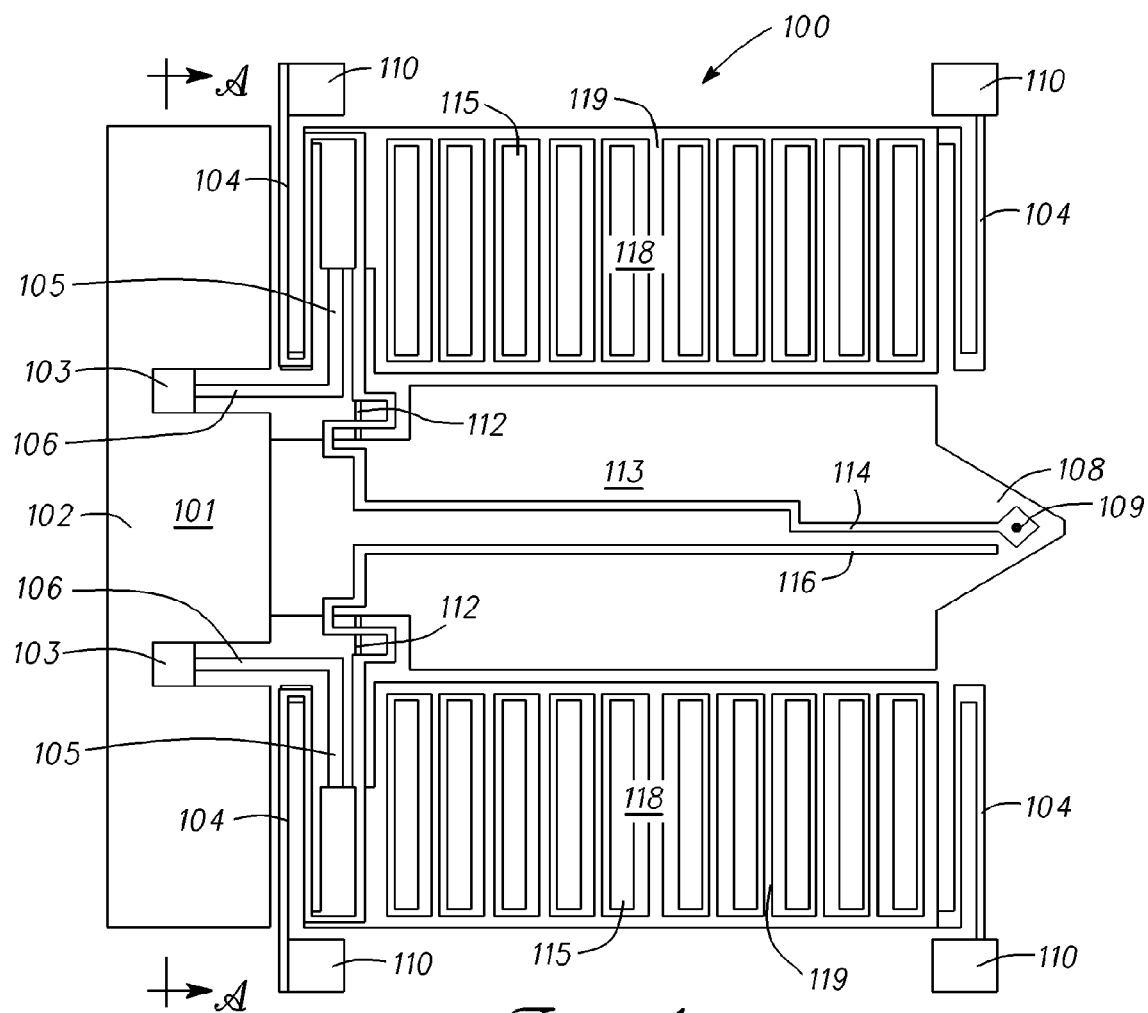
FIG. 1 is a plan view schematic of a micro-electro-mechanical (MEMS) storage device, according to but one embodiment.

For simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

Embodiments of seek and scan probe (SSP) cantilever stop structures are described herein. In the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Reference throughout the specification to "one embodiment" or "an embodiment" means that a particular feature, structure or characteristic described in connection with the embodiment is included in at least one embodiment. Thus, appearances of the phrases "in one embodiment" or "in an embodiment" in various places throughout the specification are not necessarily referring to the same embodiment. Furthermore, the particular features, structures or characteristics may be combined in any suitable manner in one or more embodiments.

FIG. 1 is a plan view schematic of a micro-electro-mechanical (MEMS) storage device, according to but one embodiment. In an embodiment, MEMS storage device 100 includes one or more lateral actuation structures 118, MEMS probe 113, and one or more stop beam structures 106, coupled as shown. In another embodiment, a MEMS storage device 100 includes one or more lateral actuation structures 118, one or more lateral actuation electrodes 115 coupled with an underlying substrate (shown in FIGS. 2-5), one or more moveable lateral actuation electrodes 119, one or more stop beam structures 106, one or more stop beam support structures 105, one or more suspension beams 104, one or more anchors 110, MEMS probe 113 having a first end 102 and a second end 108, moveable actuation electrode 101 to actuate the MEMS probe 113, probe tip 109, one or more traces 114, 116, one or more stop plates 103, and one or more torsional beams 112, coupled as shown. MEMS storage device 100 may be a seek and scan (SSP) probe with cantilever and lateral actuation functionality according to one embodiment.

Lateral actuation structure 118 may provide lateral actuation functionality to provide lateral track correction during, for example, read or write operations. In an embodiment, lateral actuation structure 118 comprises lateral actuation electrodes 115 and moveable lateral actuation electrodes 119. The one or more lateral actuation electrodes 115 may be coupled to an underlying substrate (shown in FIGS. 2-5) and may be stationary. Moveable lateral actuation electrodes 119 may be electrostatically actuated by stationary lateral actuation electrodes 115 to provide lateral track correction for the lateral actuation structure 118 and, hence, for probe tip 109.

Lateral actuation structure 118 may be coupled to the substrate by suspension beams 104 and anchors 110. A substrate may underlie the MEMS storage device 100 depicted in FIG. 1. In an embodiment, the lateral actuation structure 118 is coupled with the substrate by one or more suspension beams 104 tethered to the substrate by one or more anchors 110. Suspension beams 104 may be flexible. In an embodiment, the lateral actuation structure 118 can move at least back and forth in a direction substantially parallel with a longitudinal axis between the first end 102 and the second 108 of MEMS probe 113, if non-actuated, in a plane substantially parallel to the surface of the substrate.

Anchors 110 may be formed on the substrate and may be electrically grounded. Anchors 110 may provide electrical grounding for MEMS probe 113 and/or the lateral actuation structure 118. For example, traces 114 and 116 may be coupled with the anchors 110 as shown. Traces 114 and 116 may provide voltage to the probe tip 109 for reading and/or writing information to a storage media. "Storage media" as used herein may refer to a single storage medium or a plurality of storage mediums, or combinations thereof. Anchors 110 and other elements of MEMS storage device 100 may comprise one or more materials including, but not limited to, silicon, germanium, other group III-V semiconductor materials, group II-VI semiconductor materials, or suitable combinations thereof.

MEMS probe 113 may comprise a cantilever structure wherein the MEMS probe 113 is coupled with the lateral actuation structure 118 by one or more torsional beams 112. MEMS probe 113 may comprise a first end 102 and a second end 108 wherein a longitudinal axis extends between the first end 102 and the second end 108. MEMS probe 113 may comprise a moveable actuation electrode 101 at the first end 102 and a probe tip 109 at the second end 108. When actuated, electrostatic force may cause the MEMS probe 113 to rotate upon the torsional beams 112 such that the probe tip 109 comes into contact with a storage media (shown in FIGS. 3-5). In an embodiment, the second end 108 having the probe tip 109 can be actuated in a direction substantially normal to the surface of the substrate. The first end 102 may be actuated in a direction substantially opposite to the direction of the second end 108 because the MEMS probe 113 may rotate at the torsional beam 112.

MEMS storage device 100 may comprise one or more stop beam structures 106 coupled with the lateral actuation structure 118 to restrict motion of the MEMS probe 113 in a direction substantially normal to the surface of the substrate. One or more stop beam structures 106 may restrict motion of the MEMS probe 113 of a first end 102 in a direction substantially normal to the surface of the substrate. A variety of benefits for such motion restriction will become apparent in the remaining figures and accompanying description provided herein. Among these benefits, one or more stop beam structures 106 may increase process uniformity tolerance for gap differences between the probe tip 109 and a storage media (i.e., "tip-to-media gap" as labeled in FIG. 3) allowing higher fabrication yields of such MEMS storage devices 100. One or more stop beam structures 106 may allow extension of the tip-to-media gap coverage using the same or similar fixed voltages for reading and/or writing data with MEMS storage device 100. Additionally, one or more stop beam structures 106 may allow for wider environmental changes for successful MEMS storage device 100 operation providing for more robust performance. Furthermore, upon actuation, one or more stop beam structures 106 may prevent the moveable actuation electrode 101 of the MEMS probe 113 from contacting another underlying actuation electrode (i.e., fixed actuation electrode 240) coupled with the substrate to allow the lateral actuation structure 118 to provide lateral track correction for larger tip-to-media gaps. Another benefit includes allowing a tighter range of probe tip 109 contact force control while increasing tip-to-media gap coverage.

One or more stop beam structures 106 may be formed simultaneously with the lateral actuation structure 118. In an embodiment, stop beam structure 106 is formed simultaneously with the formation of the torsional beam 112 and/or comprises a similar thickness as the torsional beam 112 in a direction normal to the surface of the substrate. Torsional beam 112, or stop beam structure 106, or combinations thereof, may comprise a thickness in a direction normal to the surface of the substrate, that is about one fourth to one half the thickness of the lateral actuation structure 118. In an embodiment, stop beam structures 106 comprise one or more stop beam support structures 105 to couple the stop beam structures 106 with the lateral actuation structure 118. Stop beam structures 106 may be referred to as "stop fingers" and stop beam support structures 106 may be referred to as "stop arms" in an embodiment. In other embodiments, the stop beam structure 106 is directly coupled with the lateral actuation structure 118. Stop beam structure 106 may comprise a thickness in the direction substantially normal to the surface of the substrate between about 0.5 microns to about 1.5 microns, but may include other dimensions in other embodiments. Stop beam support structure 105 may comprise a thickness in the direction substantially normal to the surface of the substrate between about 2.5 microns to about 3.5 microns, but may include other dimensions in other embodiments. Stop beam structures 106 and support structures 105 may comprise a group III-V semiconductor material including, for example, silicon and germanium, or other group III-V semiconductor materials, group II-VI semiconductor materials, other semiconductor materials, or suitable combinations thereof.

MEMS storage device 100 may further comprise one or more stop plates 103 coupled with the first end 102 of the MEMS probe 113. One or more stop plates 103 may be formed using any suitable material or semiconductor fabrication process such as, for example, thin films deposition, lithography, etch, or combinations thereof. In an embodiment, one or more stop plates 103 are formed simultaneously with traces 114, 116 and use similar materials including, for example, metals, dielectrics, semiconductors, and/or combinations thereof. Upon actuation, the one or more stop plates 103 may restrict motion of the MEMS probe 113 in the direction substantially normal to the surface of the substrate when the one or more stop structures 103 come into contact with the one or more stop beam structures 106.

In an embodiment, the structure of MEMS storage device 100 depicted in FIG. 1 comprises a dimension of about 150 microns in the direction of the longitudinal axis between the first end 102 and the second end 108 of the MEMS probe 113 and about 150 microns in a direction perpendicular to the direction of the longitudinal axis described above. Claimed subject matter, however, is not limited in this regard and may include other suitable dimensions in other embodiments.

Figure 2:
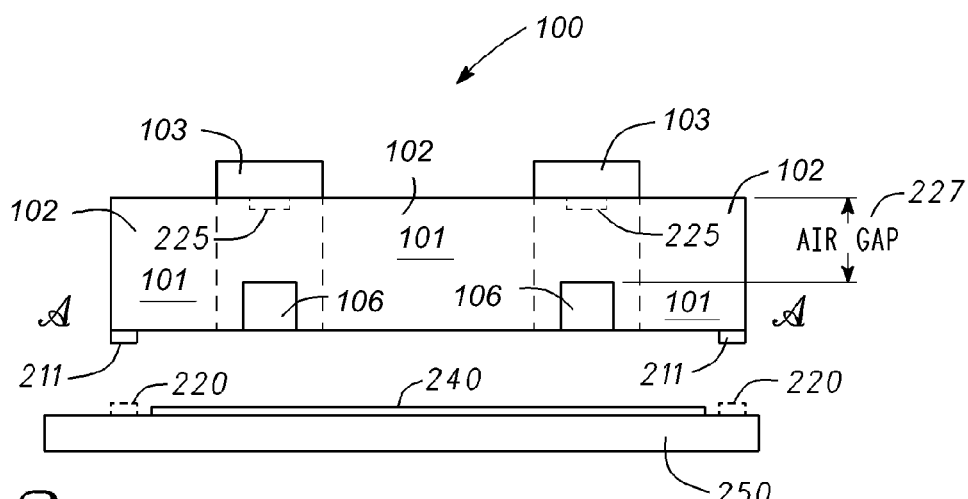
FIG. 2 is an elevation cross-section schematic of a MEMS storage device, according to but one embodiment.

FIG. 2 is an elevation cross-section schematic of a MEMS storage device, according to but one embodiment. FIG. 2 may be a representative cross-section of FIG. 1 through the first end 102 of MEMS probe 113 across the cross-section markings provided. In an embodiment, MEMS storage device 100 includes substrate 250, fixed actuation electrode 240, one or more stop contacts 211, 220, first end 102 of MEMS probe 113, moveable actuation electrode 101 comprising one or more gaps 227, one or more stop dimples 225, one or more stop plates 103, and one or more stop beam structures 106, coupled as shown.

The one or more stop beam structures 106 may be separated from the one or more stop plates 103 by a gap 227 when not actuated. In an embodiment, gap 227 is an air gap, but is not necessarily limited in this regard and may comprise other gases in other embodiments. The dimensions of stop beam structures 106 and gap 227 may be selected to allow a desired range of motion for the MEMS probe 113 that provides the benefits described herein. Stop beam structures 106 may bend slightly towards the stop plates 103 due to an internal stress gradient and may be coupled to lateral actuation structure 118 described with respect to FIG. 1. In an embodiment, stop dimples 225 may be formed on the stop plates 103 using any suitable fabrication process to make the gap 227 smaller. Gap 227 may be formed in moveable actuation electrode 101 by any suitable fabrication process including, for example, patterning by lithography, etch, or combinations thereof. In an embodiment, gap 227 represents a maximum travel distance of the moveable actuation electrode 101 to allow continued functionality of a lateral actuation structure 118.

In an embodiment, MEMS storage device 100 includes a fixed actuation electrode 240 coupled with substrate 250. Fixed actuation electrode 240 may be disposed to be sufficiently near a moveable actuation electrode 101 of MEMS probe 113 to cause the moveable actuation electrode 101 to move in a direction substantially normal to the surface of the substrate 250 upon actuation. In an embodiment, an actuation voltage applied to the fixed actuation electrode 240 causes the moveable electrode 101 to move towards the substrate 250 and close an electrostatic gap between the moveable electrode 101 and the fixed actuation electrode 240.

In an embodiment, one or more stop beam structures 106 are disposed to prevent the moveable actuation electrode 101 from contacting the fixed actuation electrode 240 on the substrate 250. One or more stop plates 103 may be coupled with the first end 102 of the MEMS probe to restrict motion of the moveable actuation electrode 101 in a direction towards the substrate 250 when the stop plates 103 contact the stop beam structures 106. One or more gaps 227 in the moveable actuation electrode 101 may allow the one or more stop plates 103 to contact the one or more stop beam structures 106 upon actuation of the MEMS probe in the direction substantially normal to the surface of the substrate 250.

MEMS storage device 100 may further include one or more contact stop structures 211, 220 to prevent the moveable actuation electrode 101 from contacting the fixed actuation electrode 240 of the substrate 250. In an embodiment, one or more contact stop structures 220 are coupled with the substrate 250 or fixed actuation electrode 240. In another embodiment, one or more contact stop structures 211 are coupled with the moveable actuation electrode 101. Combinations of contact stop structures 211 and 220 may be implemented in one or more embodiments.

Figure 3:
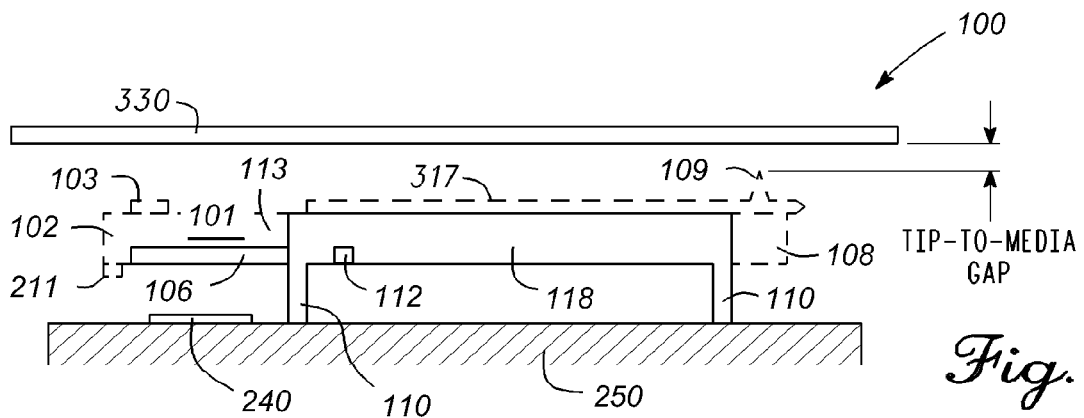
FIG. 3 is an elevation schematic of a non-actuated MEMS storage device, according to but one embodiment.

FIG. 3 is an elevation schematic of a non-actuated MEMS storage device, according to but one embodiment. A MEMS storage device 100 may include substrate 250, fixed actuation electrode 240, lateral actuation structure 118, anchors 110, one or more stop beam structures 106, one or more torsional beams 112, MEMS probe 113 having a first end 102 and a second end 108, probe tip 109, one or more traces 317, moveable actuation electrode 101, one or more stop plates 103, one or more contact stops 211, and storage media 330, coupled as shown.

MEMS storage device 100 may comprise a storage media 330 coupled with the substrate 250 wherein the storage media 330 lies in a plane that is substantially parallel to the surface of the substrate 250. In an embodiment, the probe tip 109 of the MEMS probe 113 can read or write, or combinations thereof, to the storage media 330 upon actuation.

A MEMS storage device 100 may comprise a tip-to-media gap between the probe tip 109 and the storage media 330. Due to process and environmental variations, the tip-to-media gap may vary. A larger tip-to-media gap may restrict or prevent the functionality of the lateral actuation structure 118 to provide track correction if the moveable actuation electrode 101 is allowed to contact the fixed actuation electrode 240. For example, electrostatic force between the moveable actuation electrode 101 and the fixed actuation electrode 240 may cause contact that prevents movement of the lateral actuation structure 118. In an embodiment, the one or more stop beam structures 106 allow functionality of the lateral actuation structure 118 for a larger gap between the probe tip 109 and the storage media 330 (tip-to-media gap) than for a similar or identical storage device that does not comprise the one or more stop beam structures 106. Such benefit may result because contact between one or more stop plates 103 and one or more stop beam structures 106 may inhibit contact between electrode structures 101 and 240.

In an embodiment, FIG. 3 represents a smaller tip-to-media gap of about 3 microns, but claimed subject matter is not limited in this regard. Other dimensions for a smaller tip-to-media gap may be used in other embodiments depending on at least the dimensions associated with MEMS storage device 100 and the relative dimensions and placement of associated elements.

Figure 4:
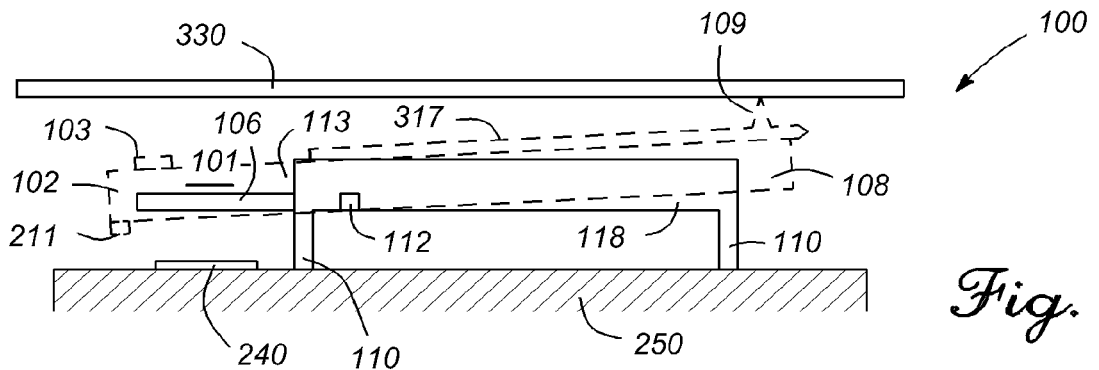
FIG. 4 is an elevation schematic of an actuated MEMS storage device, according to but one embodiment.

FIG. 4 is an elevation schematic of an actuated MEMS storage device, according to but one embodiment. A MEMS storage device 100 may include substrate 250, fixed actuation electrode 240, lateral actuation structure 118, one or more anchors 110, one or more stop beam structures 106, one or more torsional beams 112, MEMS probe 113 having a first end 102 and a second end 108 probe tip 109, one or more traces 317, moveable actuation electrode 101, one or more stop plates 103, one or more contact stops 211, and storage media 330, coupled as shown.

In an embodiment according to FIG. 4, a smaller tip-to-media gap is presented. A tip-to-media gap according to FIG. 4 may be less than or equal to about 3 microns in one embodiment, but claimed subject matter is not limited in this regard. A smaller tip-to-media gap may be defined by other dimensions depending on at least the relative size and placement of elements of MEMS storage device 100.

Upon actuation, electrostatic force between fixed actuation electrode 240 and moveable actuation electrode 101 rotates the MEMS probe 113 about the torsional beam 112 axis until the probe tip 109 is in contact with the storage media 330 at a desired contact force. In an embodiment, a desired tip contact force is within a range of about 50 nanoNewtons (nN) to about 200 nN for an actuation voltage of about 14 volts (V), but claimed subject matter is not limited in this regard and may include other ranges of contact force in other embodiments. In an embodiment, an actuation voltage comprises a voltage of about 14 V and is applied to the fixed actuation electrode 240, but may include other voltages and may be applied to the moveable actuation electrode 101 in other embodiments. A desired electrostatic force may be applied to lateral actuation structure 118 to laterally shift the lateral actuation structure 118 and, hence, MEMS probe tip 109 for data track correction. In such embodiment, the stop plate 103 may not make contact with the stop beam structure 106 and the lateral actuation structure 118 remains functional. In other words, a gap may still exist between the stop plate 103 and the stop beam structure 106.

Figure 5:
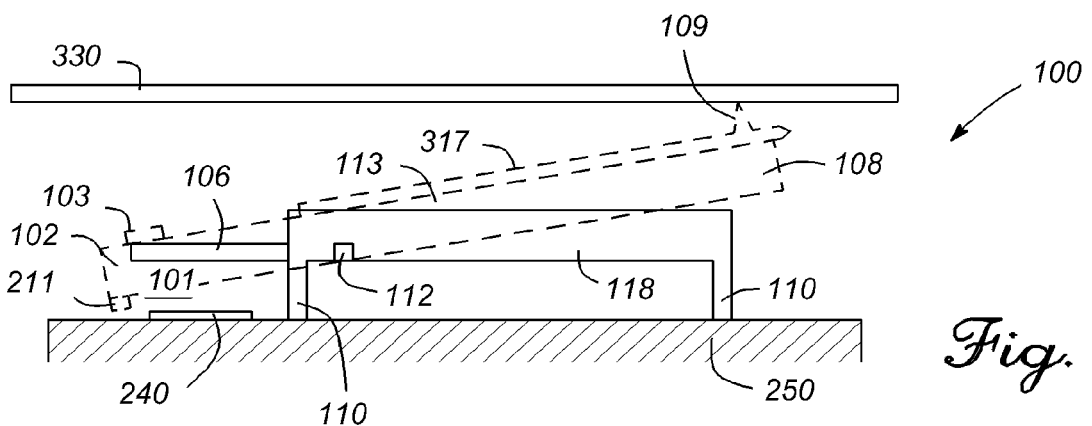
FIG. 5 is an elevation schematic of an actuated MEMS storage device with a large tip-to-media gap, according to but one embodiment.

FIG. 5 is an elevation schematic of an actuated MEMS storage device with a large tip-to-media gap, according to but one embodiment. A MEMS storage device 100 may include substrate 250, fixed actuation electrode 240, lateral actuation structure 118, one or more anchors 110, one or more stop beam structures 106, one or more torsional beams 112, MEMS probe 113 having a first end 102 and a second end 108, probe tip 109, one or more traces 317, moveable actuation electrode 101, one or more stop plates 103, one or more contact stops 211, and storage media 330, coupled as shown.

A voltage potential difference may exist between electrodes 101 and 240. For example, the moveable actuation electrode 101 may be grounded and the stationary or fixed actuation electrode 240 may have an applied voltage. An electrostatic force may be generated between the electrodes 101, 240 such that the moveable electrode 101 is attracted toward the stationary electrode 240. The magnitude of this electrostatic force may vary quadratically with the inverse of the gap or separation between the two electrodes 101, 240. Therefore, as a moveable electrode 101 moves toward a stationary electrode 240, the gap or separation necessarily decreases, resulting in a potentially dramatic increase in the electrostatic force exerted upon the moveable electrode 101. If the gap between electrodes 101 and 240 is sufficiently small, restoring stiffness of the torsional beam 112 from which the moveable electrode 101 is suspended may be overwhelmed by the electrostatic force resulting in electrostatic "pull-in" of the moveable electrode 501 with respect to the stationary electrode 240. This situation may result in failure of the device utilizing the electrode pair 101, 240.

One or more stop beam structures 106 may allow more stable operation of MEMS storage device 100 in operational regimes near electrostatic pull-in. One or more stop beam structure 106 may provide a MEMS storage device 100 that is less sensitive to small changes in the electrostatic gap near or within the pull-in regime. Such MEMS storage device 100 may have an expanded range of operation.

In an embodiment according to FIG. 5, a large tip-to-media gap is presented. A large tip-to-media gap according to FIG. 5 may be greater than or equal to about 4 microns in one embodiment, but claimed subject matter is not limited in this regard. A large tip-to-media gap may be defined by other dimensions depending on at least the relative size and placement of elements of MEMS storage device 100.

In an embodiment, an actuation voltage comprises a voltage of about 14 volts (V) and is applied to the fixed actuation electrode 240, but may include other voltages and may be applied to the moveable actuation electrode 101 in other embodiments. Upon actuation, the MEMS probe 113 may rotate such that the probe tip 109 comes in contact with the storage media 330. In the embodiment of FIG. 5, the stop beam structure 106 is in contact with the stop plate 103 leaving an electrostatic gap between the actuation electrodes 240 and 101. The stop beam structure 106 may allow functionality of the lateral actuation structure 118 for a large tip-to-media gap by preventing the moveable actuation electrode 101 from contacting the fixed actuation electrode 240. Without stop beam structure 106, the electrostatic force between electrodes 101 and 240 may pull MEMS probe 113 into the substrate 250. For example, the one or more torsional beams 112 may undergo flexure and allow pull-down of the entire MEMS probe 113 in a direction towards the substrate 250 such that physical contact prevents lateral track correction of the lateral actuation structure 118. The stop beam structure 106 may provide sufficient support to the MEMS probe to restrict such movement. The flexural stiffness of the one or more torsional beams 112 may be increased to mitigate the risk of pull-down or collapse of MEMS probe 113.

In an embodiment, the one or more stop beam structures 106 allow functionality of the lateral actuation structure 118 for a larger gap between the probe tip 109 and the storage media 330 than for a similar storage device that does not comprise the one or more stop beam structures 106. In an embodiment, the stop beam structure 106 allows for read/write functionality and lateral track correction functionality for a fixed actuation voltage of about 14 V and a tip-to-media gap up to about 5 microns. In another embodiment wherein a tip-to-media gap of about 5 microns is presented, the stop beam structure 106 may prevent the collapse or pull-down of MEMS probe 113 or torsional beam 112 beyond an actuation voltage of about 15.5 V. In yet another embodiment, stop beam structure 106 allows control of the tip contact force within a relatively tighter and more stable range than a MEMS storage device without a stop beam structure 106. For example, increased electrostatic force from an increased actuation voltage may be absorbed by the stop beam structure 106. Claimed subject matter is not limited to these particular dimensions or voltages and may include many other dimensions and voltages in accordance with a MEMS storage device of different size, relative placement or size of elements, materials, and other considerations.

Figure 6:
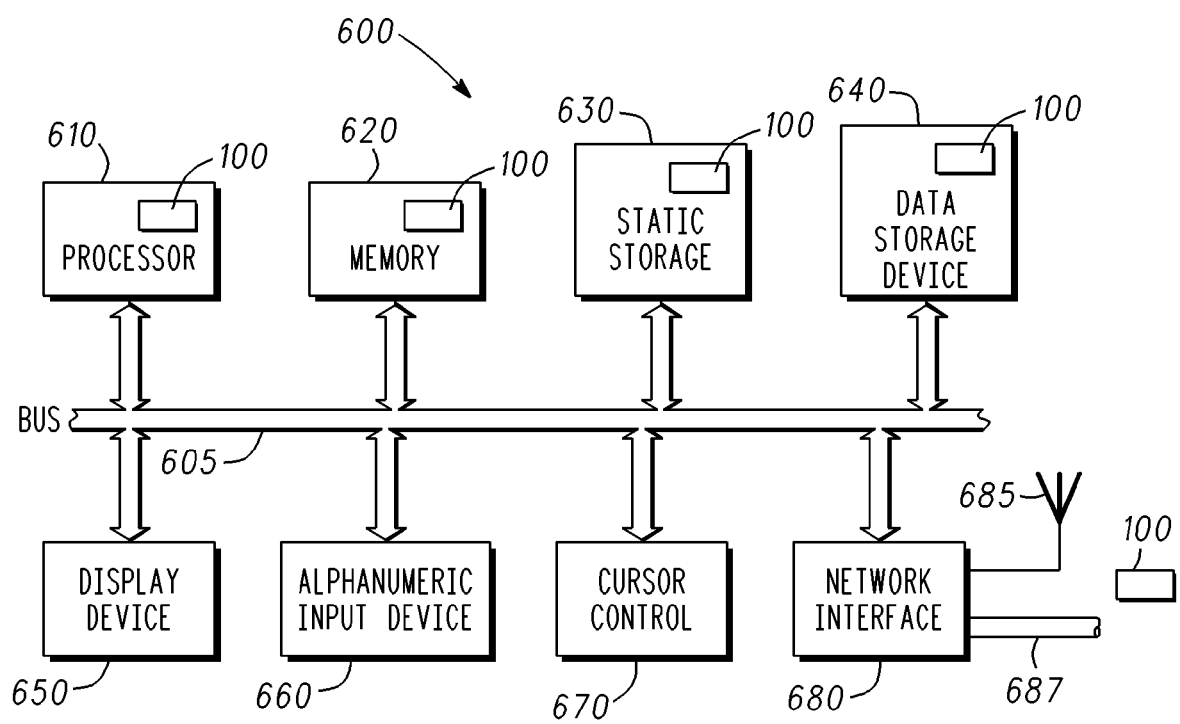
FIG. 6 is a diagram of an example system in which a MEMS storage device as described herein may be used, according to but one embodiment.

FIG. 6 is a diagram of an example system in which a MEMS storage device as described herein may be used, according to but one embodiment. System 600 is intended to represent a range of electronic systems (either wired or wireless) including, for example, desktop computer systems, laptop computer systems, personal computers (PC), wireless telephones, personal digital assistants (PDA) including cellular-enabled PDAs, set top boxes, pocket PCs, tablet PCs, DVD players, or servers, but is not limited to these examples and may include other electronic systems. Alternative electronic systems may include more, fewer and/or different components.

In one embodiment, electronic system 600 includes MEMS storage device 100 as described with respect to FIGS. 1-5. In an embodiment, a MEMS storage device 100 as described herein is part of an electronic system's processor 610, memory 620, static storage 630, data storage device 640, or coupled with network interface 680, or combinations thereof. Electronic system 600 may include a processor 610 and a MEMS storage device 100 coupled with the processor 610, wherein the MEMS storage device 100 comprises a substrate, a lateral actuation structure coupled with the substrate, a MEMS probe coupled with the lateral actuation structure, the MEMS probe having a first end, a second end having a probe tip, and a longitudinal axis extending between the first end and the second end, wherein the second end can be actuated in a direction substantially normal to a surface of the substrate, one or more stop beam structures coupled with the lateral actuation structure to restrict motion of the MEMS probe in the direction substantially normal to the surface of the substrate, and a storage media coupled with the substrate wherein the storage media lies in a plane that is substantially parallel to the surface of the substrate wherein the probe tip of the MEMS probe can read or write, or combinations thereof, to the storage media upon actuation.

Electronic system 600 may include bus 605 or other communication device to communicate information, and processor 610 coupled to bus 605 that may process information. While electronic system 600 may be illustrated with a single processor, system 600 may include multiple processors and/or co-processors. In an embodiment, processor 610 includes a MEMS storage device 100 in accordance with embodiments described herein. System 600 may also include random access memory (RAM) or other storage device 620 (may be referred to as memory), coupled to bus 605 and may store information and instructions that may be executed by processor 610.

Memory 620 may also be used to store temporary variables or other intermediate information during execution of instructions by processor 610. Memory 620 is a flash memory device in one embodiment. In another embodiment, memory 620 includes a MEMS storage device 100 as described herein.

System 600 may also include read only memory (ROM) and/or other static storage device 630 coupled to bus 605 that may store static information and instructions for processor 610. Data storage device 640 may be coupled to bus 605 to store information and instructions. Data storage device 640 such as a magnetic disk or optical disc and corresponding drive may be coupled with electronic system 600. In an embodiment, static storage 630 or data storage device 640, or combinations thereof, comprise a MEMS storage device 100 as described herein.

Electronic system 600 may also be coupled via bus 605 to display device 650, such as a cathode ray tube (CRT) or liquid crystal display (LCD), to display information to a user. Alphanumeric input device 660, including alphanumeric and other keys, may be coupled to bus 605 to communicate information and command selections to processor 610. Another type of user input device is cursor control 670, such as a mouse, a trackball, or cursor direction keys to communicate information and command selections to processor 610 and to control cursor movement on display 650.

Electronic system 600 further may include one or more network interfaces 680 to provide access to network, such as a local area network. Network interface 680 may include, for example, a wireless network interface having antenna 685, which may represent one or more antennae. Network interface 680 may also include, for example, a wired network interface to communicate with remote devices via network cable 687, which may be, for example, an Ethernet cable, a coaxial cable, a fiber optic cable, a serial cable, or a parallel cable. In an embodiment, a MEMS storage device 100 as described herein is coupled with system 600 via network interface 680.

In one embodiment, network interface 680 may provide access to a local area network, for example, by conforming to an Institute of Electrical and Electronics Engineers (IEEE) standard such as IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Previous or subsequent versions of the Bluetooth standard may also be supported.

In addition to, or instead of, communication via wireless LAN standards, network interface(s) 680 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

The above description of illustrated embodiments, including what is described in the Abstract, is not intended to be exhaustive or to limit to the precise forms disclosed. While specific embodiments and examples are described herein for illustrative purposes, various equivalent modifications are possible within the scope of the description, as those skilled in the relevant art will recognize.

These modifications can be made in light of the above detailed description. The terms used in the following claims should not be construed to limit the scope to the specific embodiments disclosed in the specification and the claims. Rather, the scope of the embodiments disclosed herein is to be determined by the following claims, which are to be construed in accordance with established doctrines of claim interpretation.

What is claimed is:

1. An apparatus, comprising:
    a substrate;
    a lateral actuation structure coupled with the substrate;
    a micro-electro-mechanical (MEMS) probe coupled with the lateral actuation structure by one or more torsional beams, the MEMS probe comprising a beam member comprising a first end, a second end comprising a probe tip, and a longitudinal axis extending between the first end and the second end, each torsional beam comprising an axis about which the torsional beam rotates, the MEMS probe being coupled to the one or more torsional beams along the beam member between the first end and the second end of the beam member, the MEMS probe being rotatably actuated around the axis of each torsional beam so that the second end moves in a direction substantially normal to a surface of the substrate; and
    one or more stop beam structures coupled with the lateral actuation structure to restrict motion of the MEMS probe in the direction substantially normal to the surface of the substrate.

2. An apparatus according to claim 1, wherein the substrate comprises a fixed actuation electrode and wherein the first end of the MEMS probe comprises a moveable actuation electrode, the one or more stop beam structures to prevent the moveable actuation electrode of the MEMS probe from contacting the fixed actuation electrode of the substrate, or to inhibit electrostatic pull-in between the moveable actuation electrode and the fixed actuation electrode, or combinations thereof.

3. An apparatus according to claim 2, further comprising:
    one or more stop plates coupled with the first end of the MEMS probe wherein the moveable actuation electrode comprises one or more gaps to allow the one or more stop plates to contact the one or more stop beam structures upon actuation of the MEMS probe in the direction substantially normal to the surface of the substrate.

4. An apparatus according to claim 3, further comprising:
    one or more contact stop structures coupled with the moveable actuation electrode or coupled with the substrate or fixed actuation electrode, or combinations thereof, to prevent the moveable actuation electrode of the MEMS probe from contacting the fixed actuation electrode of the substrate.

5. An apparatus according to claim 4, wherein the lateral actuation structure is coupled with the substrate by one or more suspension beams tethered to the substrate by one or more anchors and wherein the lateral actuation structure can move in at least one direction in a plane substantially parallel to the surface of the substrate.

6. An apparatus according to claim 5, wherein the one or more stop beam structures comprise a thickness in the direction substantially normal to the surface of the substrate that is less than about 1.5 microns, and wherein the one or more stop beam structures comprise a group III-V semiconductor material, or a group II-VI semiconductor material, or combinations thereof.

7. An apparatus according to claim 6, further comprising:
    a storage media coupled with the substrate wherein the storage media lies in a plane that is substantially parallel to the surface of the substrate wherein the probe tip of the MEMS probe can read or write, or combinations thereof, to the storage media upon actuation.

8. An apparatus according to claim 2, further comprising:
    one or more contact stop structures coupled with the moveable actuation electrode or coupled with the substrate or fixed actuation electrode, or combinations thereof, to prevent the moveable actuation electrode of the MEMS probe from contacting the fixed actuation electrode of the substrate.

9. An apparatus according to claim 2, further comprising:
    a storage media coupled with the substrate wherein the storage media lies in a plane that is substantially parallel to the surface of the substrate wherein the probe tip of the MEMS probe can read or write, or combinations thereof, to the storage media upon actuation.

10. An apparatus according to claim 1, wherein the lateral actuation structure is coupled with the substrate by one or more suspension beams tethered to the substrate by one or more anchors and wherein the lateral actuation structure can move in at least one direction in a plane substantially parallel to the surface of the substrate.

11. An apparatus according to claim 1, wherein the one or more stop beam structures comprise a thickness in the direction substantially normal to the surface of the substrate that is less than about 1.5 microns, and wherein the one or more stop beam structures comprise a group III-V semiconductor material, or a group II-VI semiconductor material, or combinations thereof.

12. An apparatus according to claim 1, further comprising:
a storage media coupled with the substrate wherein the storage media lies in a plane that is substantially parallel to the surface of the substrate wherein the probe tip of the MEMS probe can read or write, or combinations thereof, to the storage media upon actuation.

13. A system, comprising:
a processor; and
a storage device coupled with the processor, wherein the storage device comprises:
a substrate;
a lateral actuation structure coupled with the substrate;
a micro-electro-mechanical (MEMS) probe coupled with the lateral actuation structure by one or more torsional beams the, MEMS probe comprising a beam member comprising a first end, a second end comprising a probe tip, and a longitudinal axis extending between the first end and the second end, each torsional beam comprising an axis about which the torsional beam rotates, the MEMS probe being coupled to the one or more torsional beams along the beam member between the first end and the second end of the beam member, the MEMS probe being rotatably actuated around the axis of each torsional beam so that the second end moves in a direction substantially normal to a surface of the substrate;
one or more stop beam structures coupled with the lateral actuation structure to restrict motion of the MEMS probe in the direction substantially normal to the surface of the substrate; and
a storage media coupled with the substrate, the storage media being in a plane that is substantially parallel to the surface of the substrate wherein the probe tip of the MEMS probe can read or write, or combinations thereof, to the storage media upon actuation.

14. A system according to claim 13, wherein the substrate comprises a fixed actuation electrode and wherein the first end of the MEMS probe comprises a moveable actuation electrode, the one or more stop beam structures to prevent the moveable actuation electrode of the MEMS probe from contacting the fixed actuation electrode of the substrate, or to inhibit electrostatic pull-in between the moveable actuation electrode and the fixed actuation electrode, or combinations thereof.

15. A system according to claim 14, further comprising:
one or more stop plates coupled with the first end of the MEMS probe wherein the moveable actuation electrode comprises one or more gaps to allow the one or more stop plates to contact the one or more stop beam structures upon actuation of the MEMS probe in the direction substantially normal to the surface of the substrate.

16. A system according to claim 14, further comprising:
one or more contact stop structures coupled with the moveable actuation electrode or coupled with the substrate or fixed actuation electrode, or combinations thereof, to prevent the moveable actuation electrode of the MEMS probe from contacting the fixed actuation electrode of the substrate.

17. A system according to claim 13, wherein the lateral actuation structure is coupled with the substrate by one or more suspension beams tethered to the substrate by one or more anchors wherein the lateral actuation structure can move in at least one direction in a plane substantially parallel to the surface of the substrate.

18. A system according to claim 13, wherein the one or more stop beam structures allow functionality of the lateral actuation structure for a larger gap between the probe tip and the storage media than for a similar storage device that does not comprise the one or more stop beam structures.

19. A system according to claim 13, wherein the one or more stop beam structures comprise a thickness in the direction substantially normal to the surface of the substrate that is less than about 1.5 microns, and wherein the one or more stop beam structures comprise a group III-V semiconductor material, or a group II-VI semiconductor material, or combinations thereof.

* * * * *

UNITED STATES PATENT AND TRADEMARK OFFICE
CERTIFICATE OF CORRECTION

PATENT NO.        : 8,411,550 B2
APPLICATION NO.   : 12/258878
DATED             : April 2, 2013
INVENTOR(S)       : Tsung-Kuan Allen Chou et al.

Page 1 of 1

It is certified that error appears in the above-identified patent and that said Letters Patent is hereby corrected as shown below:

In the Claims

In column 11, line 26, in claim 13, delete "beams the," and insert -- beams, the --, therefor.

Signed and Sealed this
Seventeenth Day of September, 2013

Teresa Stanek Rea
*Deputy Director of the United States Patent and TrademarkOffice*